(12) United States Patent
Ko et al.

(10) Patent No.: US 10,885,380 B2
(45) Date of Patent: Jan. 5, 2021

(54) AUTOMATIC SUGGESTION TO SHARE IMAGES

(71) Applicant: Google LLC, Mountain View, CA (US)

(72) Inventors: Teresa Ko, Los Angeles, CA (US); Loren Puchalla Fiore, Mountain View, CA (US); Jason Chang, Mountain View, CA (US); Catherine Wah, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/592,542

(22) Filed: Oct. 3, 2019

(65) Prior Publication Data

US 2020/0065613 A1 Feb. 27, 2020

Related U.S. Application Data

(63) Continuation of application No. 15/352,537, filed on Nov. 15, 2016, now Pat. No. 10,438,094.

(51) Int. Cl.
*G06K 9/00* (2006.01)
*G06K 9/62* (2006.01)
*G06K 9/42* (2006.01)
*G06F 3/0482* (2013.01)

(52) U.S. Cl.
CPC ......... *G06K 9/6218* (2013.01); *G06F 3/0482* (2013.01); *G06K 9/42* (2013.01); *G06K 9/6215* (2013.01)

(58) Field of Classification Search
None
See application file for complete search history.

(56) References Cited

U.S. PATENT DOCUMENTS

| 5,077,807 | A  | * | 12/1991 | Bokser | G06K 9/6218 |
| | | | | | 382/160 |
| 8,965,893 | B2 | * | 2/2015 | Cvet | G06F 16/355 |
| | | | | | 707/737 |
| 9,122,956 | B1 | * | 9/2015 | Fink | G06K 9/6232 |
| 9,418,283 | B1 | * | 8/2016 | Natarajan | G06K 9/00463 |
| 2012/0106854 | A1 | * | 5/2012 | Tang | G06K 9/6292 |
| | | | | | 382/224 |
| 2017/0293800 | A1 | * | 10/2017 | Babenko | G06K 9/6255 |

OTHER PUBLICATIONS

USPTO, Non-final Office Action for U.S. Appl. No. 15/352,537, dated Nov. 13, 2018, 5 pages.
USPTO, Notice of Allowance for U.S. Appl. No. 15/352,537, dated May 30, 2019, 8 pages.

* cited by examiner

*Primary Examiner* — Iman K Kholdebarin
(74) *Attorney, Agent, or Firm* — IP Spring

(57) ABSTRACT

Some implementations can include a computer-implemented method and/or system for automatic suggestion to share images. The method can include identifying a plurality of images associated with a user and detecting one or more entities in the plurality of images. The method can also include constructing an aggregate feature vector for the plurality of images based on the one or more entities in the plurality of images and determining that the aggregate feature vector matches a first cluster. The method can further include, in response to determining that the aggregate feature vector matches the first cluster, providing a suggestion to the user for an image composition based on the plurality of images.

20 Claims, 7 Drawing Sheets

AUTOMATIC SUGGESTION TO SHARE IMAGES

CROSS-REFERENCE TO RELATED APPLICATIONS

This application is a continuation of U.S. patent application Ser. No. 15/352,537, filed Nov. 15, 2016 and titled AUTOMATIC SUGGESTION TO SHARE IMAGES, the entire disclosure of which is incorporated herein by reference.

BACKGROUND

The proliferation of digital image capture devices, such as digital cameras and phones with built-in cameras, permits users to capture a large number of digital images. Users may often remember to share images taken during significant events, e.g., a wedding or graduation. However, users may not remember to share images taken during times other than significant events. Sharing such images may be useful to the users and/or to recipients of the user's shared images.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to digital image management, and in particular to automatic suggestions to share digital images.

Some implementations can include a computer-implemented method. The method can include identifying a plurality of images associated with a user and detecting one or more entities in the plurality of images. The method can also include constructing an aggregate feature vector for the plurality of images based on the one or more entities in the plurality of images and determining that the aggregate feature vector matches a first cluster. The method can further include, in response to determining that the aggregate feature vector matches the first cluster, providing a suggestion to the user for an image composition based on the plurality of images.

In some implementations, each feature in the aggregate feature vector can be associated with a respective entity of the one or more entities. Constructing the aggregate feature vector can include determining, for each of the one or more entities, a count of the plurality of images in which the entity was detected; and determining a respective value for each feature based on the count of the plurality of images for the entity with which the feature is associated and a total number of the plurality of images.

In some implementations, the aggregate feature vector ($x_i$) can include a respective value ($x_{i,d}$) for each entity d of the detected one or more entities. Constructing the aggregate feature vector can include determining a total number N of the plurality of images; and determining the respective value $x_{id}$ based on a binomial distribution with parameters N and $p_d$ where $p_d$ is determined per cluster and approximates a count of the plurality of images in which entity d was detected divided by the total number N of the plurality of images.

The method can also include normalizing the aggregate feature vector. Normalizing the aggregate feature vector can include determining a scaling factor based on a total number of the plurality of images and a predetermined number.

In some implementations, determining that the aggregate feature vector matches the first cluster is based on vector comparison of the aggregate feature vector and a first cluster feature vector associated with the first cluster. In some implementations, determining that the aggregate feature vector matches the first cluster is based on a cluster-specific threshold for the first cluster.

Determining that the aggregate feature vector matches the first cluster can include performing vector comparison of the aggregate feature vector with a plurality of cluster feature vectors, where each of the plurality of cluster feature vectors is associated with a respective cluster. Determining that the aggregate feature vector matches the first cluster can also include based on the vector comparison, determining that the aggregate feature vector exceeds a first cluster-specific threshold for the first cluster by a first value and that the aggregate feature vector exceeds a second cluster-specific threshold for a second cluster, different from the first cluster, by a second value, and determining that the first value is greater than the second value.

The method can further include programmatically analyzing the plurality of images to determine whether the plurality of images meet quality criteria, wherein providing the suggestion is performed in response to determination that the plurality of images meet the quality criteria.

In some implementations, providing the suggestion comprises causing a user interface to be displayed to the user to share the image composition, where the user interface can include a user-selectable element. The method can also include, receiving user input indicative of selection of the user-selectable element to share the image composition, and, in response to receiving the user input, generating the image composition. The user interface can further include text associated with the first cluster.

In some implementations, generating the image composition can include at least one of: generating an album that includes the plurality of images; generating an image collage that includes the plurality of images; and generating a video that includes the plurality of images. The method can further include receiving user input to share the image composition, and in response to the user input, generating the image composition, and sending a message indicative of the image composition to one or more other users.

The method can also include receiving an additional image associated with the user, wherein the additional image is different from the plurality of images, and updating the aggregate feature vector based on one or more detected entities in the additional image. The method can further include determining that the updated aggregate feature vector matches the first cluster, and, in response to determining that the updated aggregate feature vector matches the first cluster, adding the additional image to the image composition.

Identifying the plurality of images associated with the user can include determining images associated with the user that are one or more of: associated with a timestamp within a particular time range, and associated with a location within a particular location range.

Some implementations can include a system having one or more processors, and a memory coupled to the one or more processors with instructions stored thereon that, when executed by the one or more processors, cause the one or more processors to perform operations. The operations can include identifying a plurality of images associated with a user, and detecting one or more entities in the plurality of images.

The operations can also include constructing an aggregate feature vector for the plurality of images based on the one or more entities in the plurality of images, and determining that the aggregate feature vector matches a first cluster feature vector for a first cluster from a plurality of clusters. The operations can further include, in response to determining that the aggregate feature vector matches the first cluster feature vector, causing a user interface to displayed, wherein the user interface includes a user-selectable element to share an image composition based on the plurality of images.

The operations can also include receiving user input indicative of selection of the user-selectable element, and in response to the user input, generating the image composition based on the plurality of images and sharing the image composition with one or more other users. The operations can further include normalizing the aggregate feature vector by multiplying the aggregate feature vector by a scaling factor determined based on a total number of the plurality of images and a predetermined number.

Some implementations include a computer-implemented method. The method can include receiving a plurality of image groups that each include a respective plurality of images, and constructing a respective aggregate feature vector for each of the plurality of image groups based on the respective plurality of images. The method can also include programmatically determining a plurality of clusters based on the respective aggregate feature vector for each of the plurality of image groups, wherein each cluster of the plurality of clusters is based on one or more respective image groups of the plurality of image groups and each image group of the plurality of image groups is associated with one cluster of the plurality of clusters.

The method can further include receiving an aggregate feature vector for a candidate image group not included in the plurality of image groups, the candidate image group including a plurality of candidate images associated with a user, and determining whether the aggregate feature vector matches a particular cluster of the plurality of clusters by comparison of the aggregate feature vector with the plurality of clusters. The method can also include providing a suggestion to the user for an image composition from the plurality of candidate images in the candidate image group, if it is determined that the aggregate feature vector matches the particular cluster.

Constructing the respective aggregate feature vector for an image group can include identifying one or more detected entities in each image of the respective plurality of images of the image group, and determining a respective value for each entity of the one or more detected entities. Identifying the one or more detected entities can include determining a respective probability for each entity of the one or more detected entities that an image of the respective plurality of images includes the entity.

DETAILED DESCRIPTION

Figure 1:
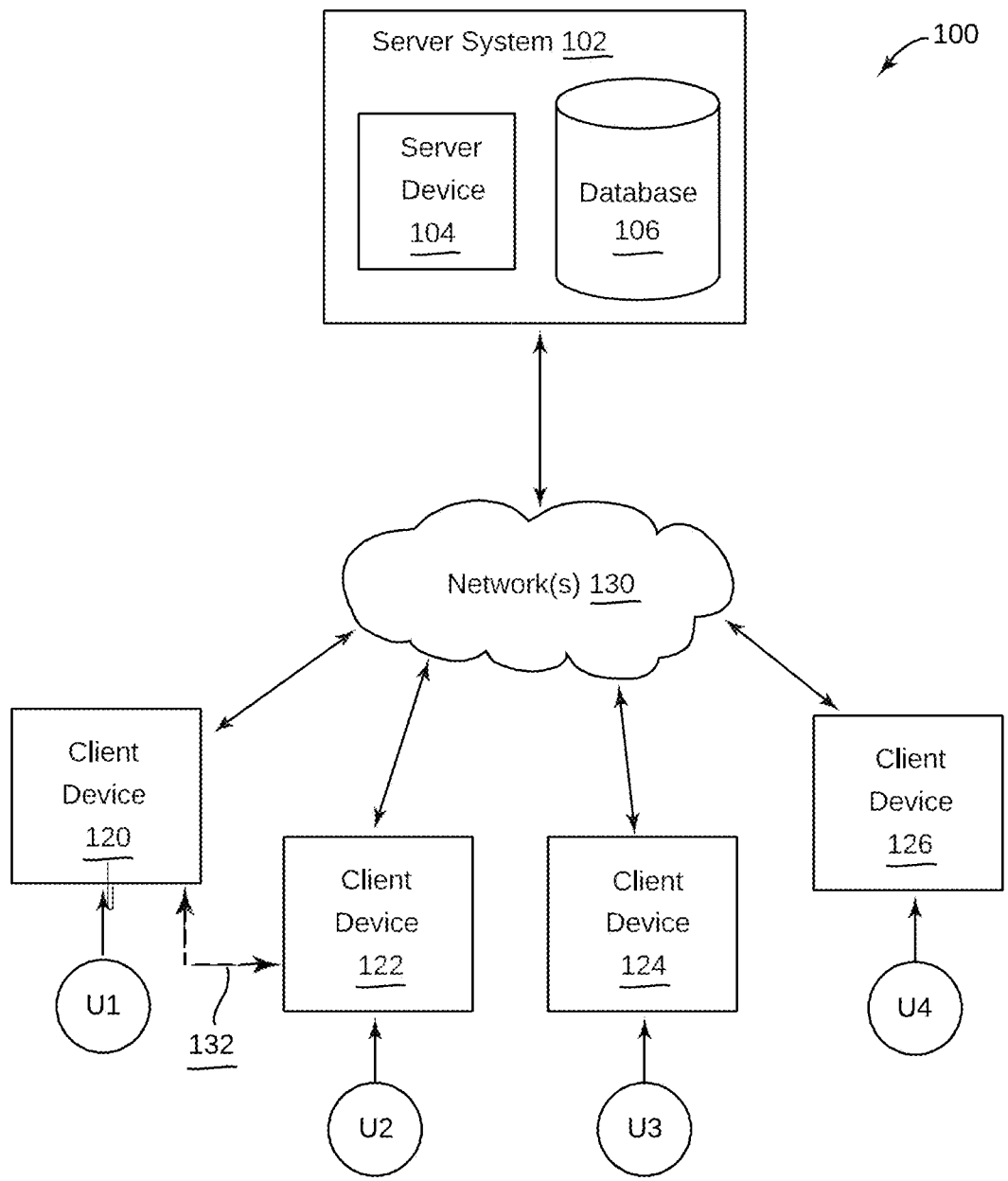
FIG. 1 is a block diagram of example systems and a network environment which may be used for one or more implementations described herein.

Some implementations can include constructing a large dataset of shared albums from user data that has been provided with permission of respective users, where each album can include of a set of photos. Each photo can be annotated with probabilities of having any particular object (or entity). For example, a photo may have a dog with 99% probability, food with 85% probability, and other entities with some associated probability.

Each album can include a feature vector over the space of entities, aggregated over the photos. For example, for an album containing 10 photos, a feature vector might include: dog: 8, food: 7, outdoors: 5, person: 5, etc., where the number of a given entity approximately corresponds to the number of photos with that entity.

A model can be learned that clusters the features of a given feature vector into separate groups. Each group may identify a pattern of shared photos. Each album may be modeled as a distribution, for example as a sparse, multi-variate Binomial distribution. The parameters for each cluster can be drawn from a sparse, multivariate Beta distribution. These albums can then be clustered using a Dirichlet process mixture model or other suitable technique.

Some implementations can have an inference method that includes an optimization based approach. The inference method can also include a distributed inference method that is adapted to operate over multiple computers to provide fast inference. For example, some implementations can dynamically learn new types of clusters (e.g., associated with a type of activity not observed in prior groups of images) and provide suggestions for groups of images that match the new types of clusters.

The systems and methods provided herein may overcome one or more deficiencies of some conventional image management systems and methods. For example, image management includes enabling users to capture and/or share images (e.g., digital images represented as data stored in a nontransitory computer readable medium) with other users. With the easy availability of digital image capture devices, such as digital cameras, phones with built-in cameras, wearable devices with cameras, head-mounted devices, tablets, personal computers, etc., users may capture a large number (e.g., a hundred, a thousand, etc.) images. Conventional image management systems may enable users to share one or more of the captured images, e.g., via an online image sharing album, via a messaging service, via e-mail etc. Conventional image management systems perform sharing upon user commands to share the images. For example, a user may share images from a significant event, e.g., a wedding, a graduation, etc. with other users, e.g., friends, family members, colleagues, etc. using these systems. A user may capture numerous images outside of such significant events, e.g., during a daily commute, during a vacation, during family reunions, celebrations, and other events. The user may not remember capturing such images outside of significant events and may also not remember to share such images with other users. In this manner, conventional image management systems may not share a substantial portion of images, where sharing such images may be useful to a user.

Further, some conventional image management systems provide suggestions to share images, e.g., based on objects (e.g., one or more faces) recognized in the images, based on a particular number of new images captured since a previous sharing activity, etc. However, such suggestions may not be accurate or useful, e.g., if the images are not a group of images that are thematically related. For example, users may have a preference to share groups of images that are thematically related, e.g., images from an event (e.g., birthday party, soccer game, trek, etc.), images related to a location (e.g., taken at a stadium, taken at a ski resort, etc.), images related to particular types of activities (e.g., surfing, skydiving, cooking, etc.) and so on. Conventional image management systems may not recognize thematic relationships among images when providing suggestions.

The example systems and methods described herein may overcome one or more of the deficiencies of conventional image management systems to provide users suggestions to share groups of images, e.g., as an image composition. A technical problem of some conventional image management systems may be that such systems do not suggest sharing groups of images. Further, conventional systems that provide suggestions may generate such suggestions based on attributes of individual images, or other factors that do not take into account characteristics of a group of images, or suitability of a group of images for sharing.

The disclosed subject matter relates to particular techniques to generate suggestions to share a group of images, e.g., as image compositions such as image albums, video, collage, etc. The suggestions are based on instantiating a process on a computer to determine the group of images matching one or more clusters determined from prior groups of images that were shared. The one or more clusters determined by the process on the computer, being based on prior groups of images that were shared, have a thematic relationship between individual images that are in a group in the cluster.

Particular implementations may realize one or more of the following advantages. An advantage of generating suggestions based on methods and system described herein is that the suggestions are based on a thematic relationship between images in an image group that is suggested, e.g., based on matching an image group with clusters that are generated based on prior image groups. Another advantage is that, if an image group is not found to match a cluster, image suggestions may not be provided, thereby reducing or eliminating generation of suggestions that a user may not approve, which can result in fewer processing operations and thus reduced latency in the overall system. A further advantage of some implementations is that the suggestion can be customized based on a cluster that matches the group of images. Such customization permits providing a graphical user interface on a device that provides an indication of the thematic relationship to the user. Another advantage is that the techniques presented herein may not need templates or other types of user input to recognize clusters and provide suggestions. Yet another advantage is that the methods and systems described herein can dynamically learn new types of clusters (e.g., associated with a type of activity not observed in prior groups of images) and provide suggestions for groups of images that match the new types of clusters. The systems and methods presented herein automatically provide suggestions to share a group of images that are more likely to be accepted by users, that are based on thematic relationships between images in a group, that enables users to share a group of images with minimal effort, and that facilitate greater sharing of images.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image management program. The image management program may allow a system (e.g., client device or server device) to provide options for displaying and manipulating images and image compositions, some examples of which are described herein. The image management program can provide associated user interface(s) that are displayed on a display device associated with the server system or client device. The user interface may provide various options to a user to select images and/or users, generate image compositions, etc. Other applications can also be used with one or more features described herein, such as browsers, email applications, communication applications, etc.

Various implementations of features described herein can use any type of system and/or service. For example, social networking services, image collection and sharing services, assisted messaging services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
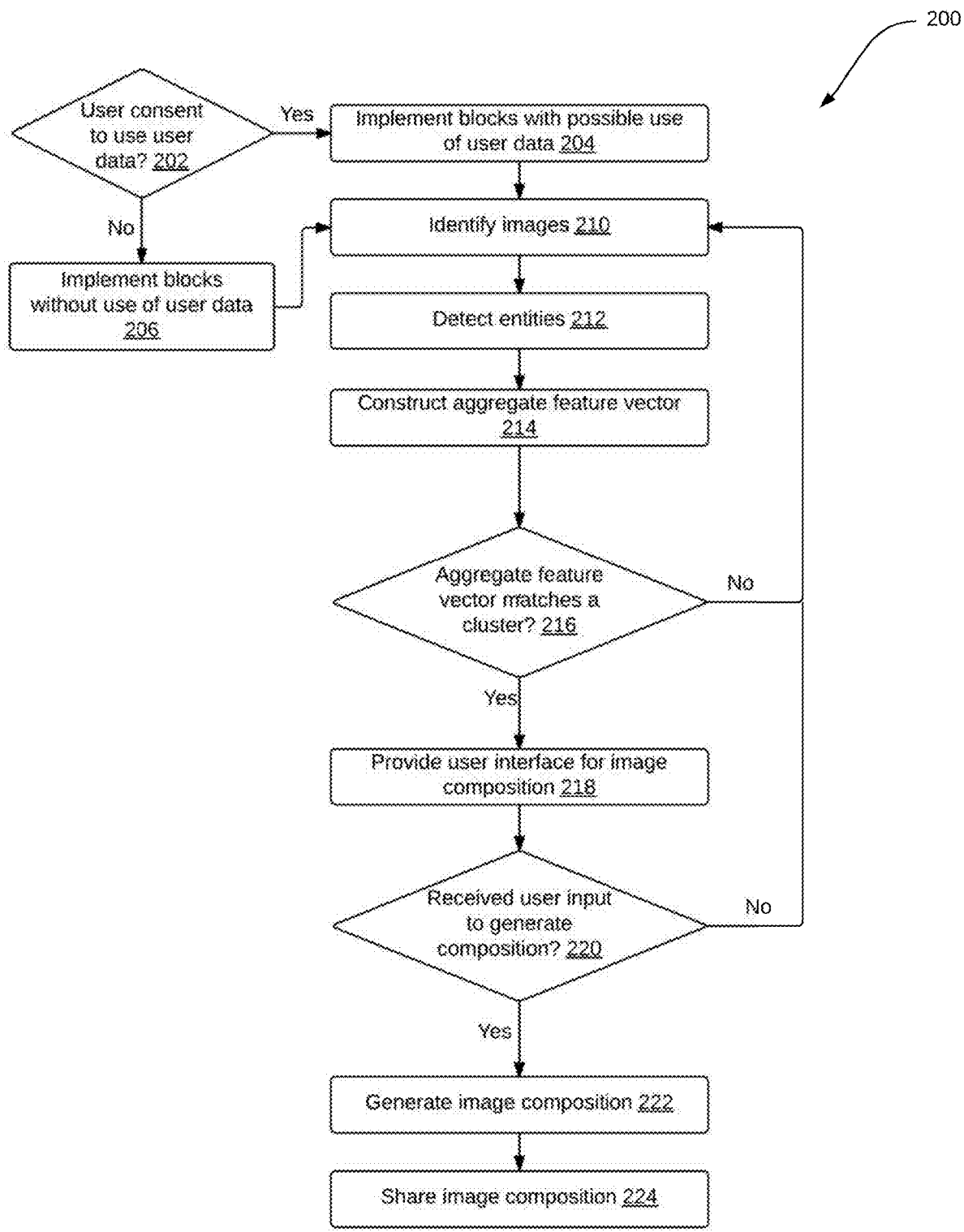
FIG. 2 is a flow diagram illustrating an example method to provide image composition suggestions, according to some implementations.

FIG. 2 is a flow diagram illustrating an example method 200 to provide image composition suggestions, according to some implementations.

In some implementations, method 200 can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input.

In some implementations, the method 200, or portions of the method, can be initiated automatically by a device. For example, the method (or portions thereof) can be periodically performed, or performed based on the occurrence of one or more particular events or conditions. For example, such events or conditions can include a particular application being opened by a user, obtaining one or more images that have been newly captured by, uploaded to, or otherwise accessible by a device (e.g. a user device), a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 200 with access to a large collection of accessible images, e.g., a user's collection of images (if user consent is received). In another example, a camera, cell phone, tablet computer, wearable device, or other client device can capture one or more images and can perform the method 200. In addition, or alternatively, a client device can send one or more captured images to a server over a network, and the server can process the images using method 200.

In block 202, it is checked whether user consent (e.g., user permission) has been obtained to use user data in the implementation of method 200 (and method 500, described below). For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, calendar and appointments, content, ratings, and opinions created or submitted by a user, a user's geographical location, historical user data, etc. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 210. If user consent has not been obtained, it is determined in block 206 that blocks are to be implemented without use of user data, and the method continues to block 210. In some implementations, if user consent has not been obtained, the remainder of method 200 is not performed, and/or particular blocks needing the user data are not performed.

In block 210, a plurality of images associated with a user is identified. For example, the plurality of images may be images captured by the user, e.g., with any of client devices 120-126. In another example, the plurality of images may be uploaded by the user, e.g., to an online image library of the user. In another example, the plurality of images may be obtained by the user, e.g., by performing a scan (e.g., using an optical scanner device) of printed images. In another example, the plurality of images may be received by the user, e.g., via a photo application, over a messaging service, via e-mail, through use of a social network service, etc.

In some examples, the plurality of images may include respective metadata. For example, a client device that captures an image may include metadata such as capture date, capture time, capture location, camera make/model, capture settings (e.g., aperture, shutter speed, ISO, focus mode, etc.), a filename of the image, etc. In another example, an image may include user-generated metadata, e.g., tags associated with portions of the image, comments or other text associated the image, etc. In some implementations, the plurality of images may be identified based on timestamps associated with the images. For example, the plurality of images may be identified based on a timestamp associated with each image being within a particular time range (e.g., within the last hour, within the last day, within the last week). In another example, the plurality of images may be identified as images with associated timestamps that are greater (e.g., represent a later time) than a timestamp associated with a previously generated composition. In yet another example, the plurality of images may be identified based on a location of the images being within a particular location range, e.g., within a particular city, within a particular country, near a landmark, point of interest, etc. The method continues to block 212.

In block 212, each image of the plurality of images is programmatically analyzed (e.g., with a software program, with a hardware processor configured to perform image analysis, etc.) to detect one or more entities. For example, in some implementations, image metadata may include one or more labels associated with objects that are detected in the image e.g., based on prior analysis of the image. In some implementations, e.g., when image metadata does not include one or more labels, image analysis may be performed using object recognition techniques, computer vision techniques, etc. Based on the image analysis, one or more labels may be applied to the image (e.g., included in image metadata, stored in a database with reference to the image, etc.) In some implementations, an object may be detected as present or absent from an image, and a label corresponding to the object is applied to the image when the object is detected as present in the image.

Entities may be detected in the image based on the objects detected in the image, e.g., based on labels. In some implementations, more than one label may be associated with an entity, e.g., labels "basketball", "basketball game", and "hoop" may all be associated with the entity "basketball." In various implementations, a label may refer to one or more individual objects that are detected in the image, and one or more entities may be detected based on the labels. For example, in response to detecting objects such as a "hoop" or "basketball backboard", "basketball court", "ball," etc. being detected in the image, the entity "basketball" may be detected.

Figure 3A:
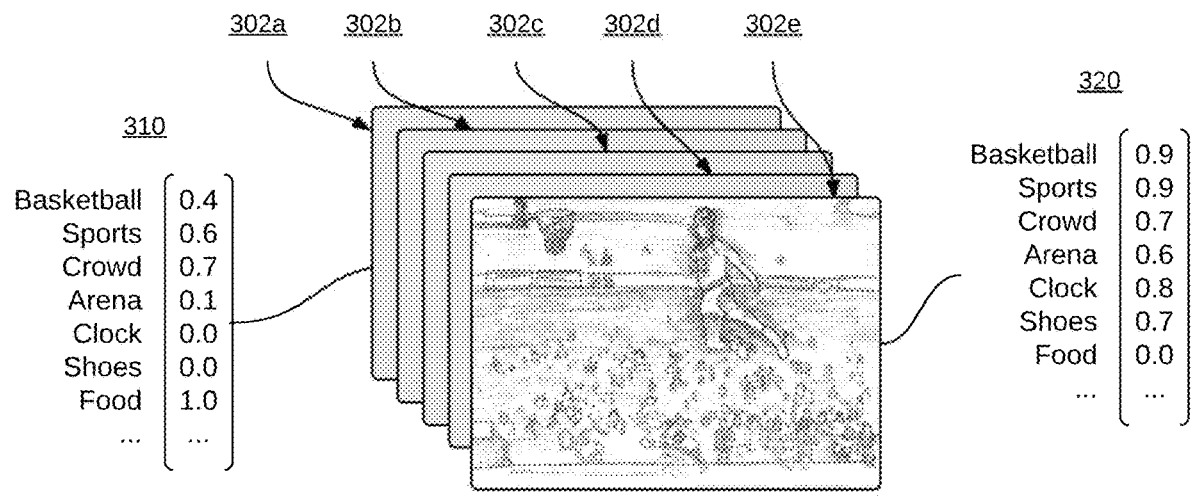
FIG. 3A illustrates a set of images and entities detected in the images, according to some implementations.

In some implementations, an entity may have an associated probability value, e.g., based on the object recognition. For example, the probability value may be 1.0 if the object determination technique identifies an object in the image (e.g., assigns one or more labels associated with the entity) with a confidence level that meets a threshold level, and may be between 0 and 1 if the confidence level does not meet the threshold level. For entities that are not detected in the image (e.g., no labels associated with the entity are applied to the image), the probability may be 0. FIG. 3A shows examples of images with detected entities and associated probabilities. The method continues to block 214.

In block 214, an aggregate feature vector is constructed for the plurality of images identified in block 210. In some implementations, the aggregate feature vector includes one or more features that each correspond to an entity. Each feature may be associated with a respective value. In some implementations, the respective value may be the count of images from the plurality of images in which the entity is detected. For example, when a particular entity is detected in two images of the plurality of images, the respective value for the feature corresponding to that entity may be two. In some implementations, the respective value may be a proportion of the plurality of images in which the entity is detected, e.g., if a particular entity is detected in four images and a count of the plurality of images is ten, the value for the feature corresponding to that entity may be 0.4.

Figure 3B:
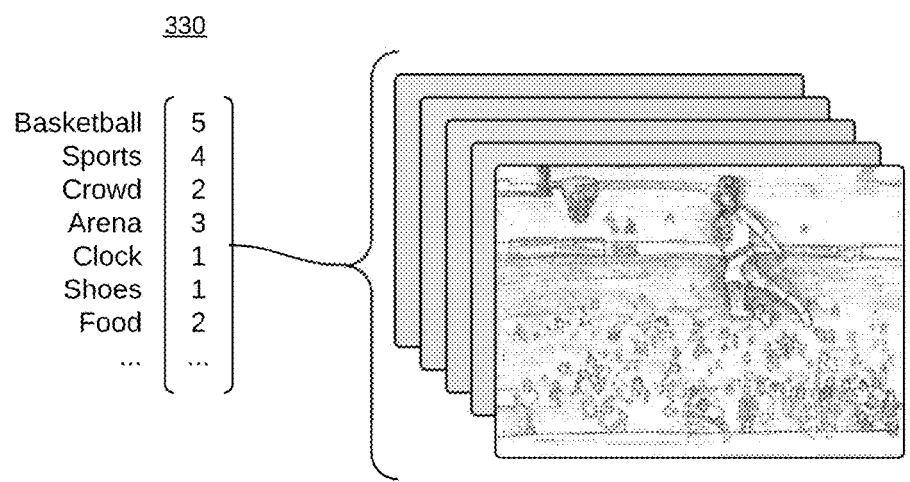
FIG. 3B illustrates the set of images of FIG. 3A with an aggregate feature vector, according to some implementations.

In some implementations, the respective value (denoted as $x_{id}$) for a feature (corresponding to an entity d) may be determined based on the probability associated with the entity in the plurality of images. For example, the respective value may be determined based on a binomial distribution. The binomial distribution is determined with a total number of the plurality of images (denoted as N) that were identified in block 210 and a parameter $p_d$ which is the probability of obtaining an image in which the entity is detected based on a single draw (e.g., randomly selecting one image) from the plurality of images. For example, $p_d$ may be estimated per cluster and may approximate a count of images in which the entity is detected (e.g., probability greater than a probability threshold, e.g., 1.0) divided by the total number N of the plurality of images. FIG. 3B illustrates an example aggregate feature vector, corresponding to the plurality of images illustrated in FIG. 3A. The method continues to block 216.

In block 216, the aggregate feature vector for the plurality of images is compared with a plurality of clusters to determine if the aggregate feature vector matches a cluster. In some implementations, the plurality of clusters may each be associated with a respective cluster feature vector. In these implementations, the aggregate feature vector may be compared with a respective cluster feature vector to determine if the aggregate feature vector matches the cluster. For example, a vector comparison of the aggregate feature vector and each respective cluster feature vector may be performed. In some implementations, a vector distance between the aggregate feature vector and each respective cluster feature vector is determined based on the vector comparison. The vector distance may indicate the match between the aggregate feature vector and each respective cluster feature vector, e.g., a small vector distance may correspond to a close match and a large vector distance may indicate that the aggregate feature vector does not match the cluster feature vector.

In some implementations, prior to comparing, the aggregate feature vector may be normalized. For example, a normalized cluster feature vectors may include respective values that are determined based on a predetermined number of images per cluster. If the total number of the plurality of images identified in block 210 is less than or equal to the predetermined number, a likelihood that the aggregate feature vector matches a cluster feature vector may be higher than if the total number of the plurality of images is higher than the predetermined number of images per cluster. In some implementations, the aggregate feature vector may be normalized, e.g., to ensure that matching of the aggregate feature vector and the cluster feature vector is independent of the total number of the plurality of images.

For example, the aggregate feature vector may be scaled, e.g., by multiplying the aggregate feature vector with a scaling factor. In various implementations, the scaling factor may be a scalar value. In some implementations, the scaling factor may be based on the total number of the plurality of images, and the predetermined number of images per cluster. In some implementations, the scaling factor may be selected such that the respective values in the feature vector are adjusted such that the normalized aggregate feature vector corresponds to the predetermined number of images. In some implementations, the scaling factor may be proportional to a ratio of the total number of the plurality of images and the particular number of images per cluster. For example, if the predetermined number is 10 and the total number of the plurality of images is 20, the scaling factor may be 2. In some implementations, normalization may be based on the total number of the plurality of images and the predetermined number, and may be adjusted based on the two numbers. In some implementations, the predetermined number of images per cluster feature vector may be a same number for each cluster. In some implementations, the particular number of images per cluster feature vector may be different for the different clusters. In some implementations, the predetermined number for each cluster may be determined based on the groups of images that are in the cluster.

In some implementations, a match may be determined between the aggregate feature vector and a particular cluster feature vector meeting cluster-specific thresholds. For example, a "baseball" cluster may include a feature vector corresponding to entities such as "baseball," "team sport," and "people". In this example, the cluster feature vector may include a value of 75% (or 0.75) corresponding to the entity "baseball" e.g., if the cluster is determined based on sets of images in which the entity "baseball" is detected as present in 75% images of each set. In another example, a "food" cluster may include a feature vector that includes an entity "food" with a value of 40% (or 0.4), e.g., if the food cluster is determined based on sets of images in which the entity "food" is detected as present in 40% images of each set. Such differences in respective values of feature vectors may arise, e.g., based on the probabilities of different entities in the sets of images that are used to generate the clusters. Cluster-specific thresholds may be used to adjust for the different probabilities associated with various features in the different clusters when comparing the aggregate feature vector with each cluster.

In some implementations, it may be determined that the aggregate feature vector meets the cluster-specific threshold of more than one cluster, e.g., the aggregate feature vector exceeds a first cluster-specific threshold for a first cluster by a first value determined based on comparison of the aggregate feature vector and a first cluster feature vector associated with the first cluster and that the aggregate feature vector exceeds a second cluster-specific threshold for a second cluster by a second value determined based on comparison of the aggregate feature vector and a second cluster feature vector associated with the second cluster. In these implementations, determination is made that the aggregate feature vector matches the first cluster based on the first value being greater than the second value, e.g., which indicates that the plurality of images match more closely with the first cluster than with the second cluster. If it is determined that the aggregate feature vector matches a particular cluster (e.g., the first cluster), the method continues to block 218. If it is determined that the aggregate feature vector does not match any cluster, the method continues to block 210, where another plurality of images may be identified.

In some implementations, the plurality of images may be programmatically analyzed to determine whether the images meet one or more quality criteria. For example, an image may not meet quality criteria based on one or more of: focus, e.g., if one or more objects in the image are detected as being out of focus; an illumination level, e.g., if the illumination level in the image does not meet a threshold illumination level; a type of objects detected in the image, e.g., an image in which only text objects are detected (e.g., receipts, scanned documents, etc.); etc. In some implementations, if one or more of the plurality of images does not meet the quality criteria, blocks 218-224 may not be performed, e.g., suggestions for image compositions are not provided to the user.

In block 218, a user interface that includes a suggestion for an image composition is provided to the user with whom the plurality of images is associated. For example, the user interface may be provided to the user e.g., in a notification on a client device, as a chat message in a messaging application, as a suggestion card in an image application, etc. In some implementations, the user interface may include information, e.g., one or more of the plurality of images, a preview of the composition, a type of the composition, etc.

Figure 6:
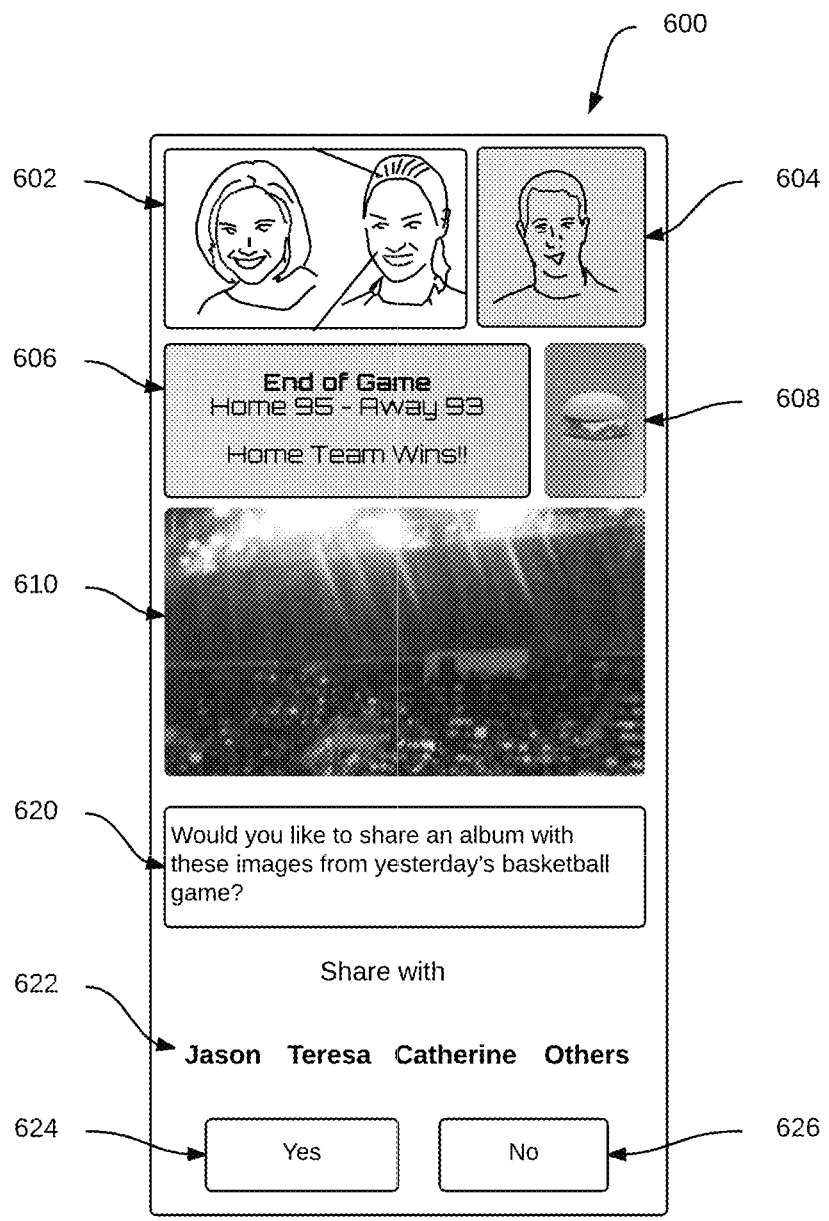
FIG. 6 is a diagrammatic illustration of an example of user interface to provide suggestion for an image composition, according to some implementations.

FIG. 6 illustrates an example user interface. In some implementations, the user interface may include one or more options, e.g., an option to generate the image composition, an option to decline generation of the image composition, an option to share the image composition (e.g., with one or more other users), an option to edit the image composition, etc. In some implementations, the user interface may include one or more user identifiers of one or more other users with whom the composition may be shared. In some implementations, the user interface may permit users to select the one or more other users with whom the composition may be shared, e.g., by removing one or more user identifiers, by adding one or more other user identifiers, etc. In various implementations, the user identifiers may include, e.g., a user name associated with a user account, a user profile image associated with a user account, a phone number associated with the one or more other users, etc. In some implementations, e.g., when a user indicates a preference for the image composition to be automatically shared, block 218 may not be performed (or may be performed once, e.g., to enable the user to indicate the preference) and the image composition may be generated and shared based on the indicated user preference. The method continues to block 220.

In block 220, user input is received. For example, the user input may be indicative of user selection of one or more of the user-selectable elements in the user interface. If the user input indicates that the composition is to be generated, the method continues to block 222. If the user input indicates that the composition is not to be generated (e.g., if the user selects the option to decline generation of the image composition), the method continues to block 210. In implementations where the user indicates a preference for automatic generation and/or sharing of the image composition, block 220 may not be performed, e.g., the method proceeds directly from block 216 or block 218 to block 222.

In block 222, an image composition is generated based on the plurality of images. For example, the image composition may be an image album that includes the plurality of images. In some implementations, the image composition may be generated by adding the plurality of images to an album data structure (e.g., a data structure that includes identifiers associated with the plurality of images, an order of the images for the album, layout information to display the plurality of images, etc.) Further, in some implementations, the plurality of images may be ordered, e.g., chronologically (e.g., based on a timestamp in image metadata), based on entities detected in each image, based on image characteristics (e.g., color, brightness, sharpness, image content such as faces, objects, etc.), by location (e.g., based on location information in image metadata, etc.), and other factors, or a combination of these factors. In some implementations the plurality of images may be ordered based on user-generated metadata, e.g., tags associated with portions of the image, likes associated with images, favorited images, comments or other text associated the image, etc.

In another example, the image composition may be an image collage that includes the plurality of images. For example, the image collage may include the plurality of images as an image pile (e.g., on top of each other), as a grid (e.g., images laid out next to each other in different directions, such as a vertical direction, a horizontal direction, etc.), or as a multiple exposure collage (e.g., where pixel values of an image of the plurality of images are combined with corresponding pixel values of other images of the plurality of images).

In another example, the image composition may be a video that includes the plurality of images. In some implementations, the video may be based on a theme associated with the cluster that matches the plurality of images (e.g., a "sports" theme may be associated with a baseball cluster, a "birthday" theme may be associated with a birthday cluster, etc.) In some implementations, the plurality of images may be included in the video sequentially, in chronological order, in an order determined based on the theme and image content, in an order of locations associated with the images, or a combination. In some implementations, the video may include audio, e.g., determined based on the theme for the video. In some implementations the image composition may be a GIF.

In some implementations, the image composition may be generated as a combination of one or more of an album, an image collage, and a video, based on the plurality of images. For example, the image composition may be generated as an album that includes a first subset of the plurality of images, an image collage that includes a second subset of the plurality of images, and a video that includes a third subset of the plurality of images. In some implementations, a type of the image composition may be determined automatically, based on the cluster with which the aggregate feature vector was matched. The method continues to block 224.

In block 224, the image composition (e.g., generated in block 222) may be shared, based on user input. For example, the user input received in block 220 (or additional user input, e.g., received after the image composition is generated) may indicate that the image composition is to be shared with one or more other users, e.g., corresponding to user identifiers included in the user interface that are selected by the user, etc. In another example, the user input may indicate that the composition is to be shared, e.g., on an image-sharing network, from a photo application to one or more other users using the same or a different photo application, on a social network, in a chat group, in an email message, etc. In response to the user input, the image composition may be shared to a respective destination. For example, if the user input indicates an email address of a first other user, a phone number of a second other user, a messaging username (e.g., a handle) of a third other user, and a social network identifier of a fourth other user, the image composition is shared with the respective other users to the respective destination via the chosen modality, e.g., the image composition (or a link to the image composition) is sent as a message via email, via Short Message Service (SMS), via a messaging application, and via the social network for each of the respective other users. In some implementations, a preview (e.g., a thumbnail, a snippet, etc.) of the image composition may be shared in a message to the other users that includes a link to a destination (e.g., a Uniform Resource Locator) where the image composition is available.

In FIG. 2, various blocks (e.g., blocks 210-224) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

While the foregoing description refers to an image composition based on the plurality of images, in some implementations, one or more additional images associated with the user may be identified after the image composition is generated. For example, the additional images may be received (e.g., captured by a user device, uploaded to a server device, etc.) after the image composition is generated. In some implementations, the aggregate feature vector may be updated based on one or more entities that are detected in an additional image (e.g., based on performing object recognition, based on labels associated with the additional image, etc.) Further, it may be determined that the updated aggregate feature vector matches the first cluster (e.g., based on comparing the updated aggregate feature vector with the cluster feature vector associated with the first cluster). In response to the determination, the additional image may be added to the image composition. For example, the additional image may be added to an album (e.g., inserted in an album data structure), may be appended to a video (e.g. inserted at the end of a video, inserted at another location in the video, based on metadata of the additional image), or added to an image collage. In some implementations the additional images may be added automatically. In some implementations the additional images may be added after user input is received indicating to add the additional images to the image composition.

FIG. 3A illustrates a set of images and entities detected in the images, according to some implementations. For example, the set of images may be identified, e.g., based on timestamps and/or location, as described above with reference to FIG. 2. While FIG. 3A shows five images 302*a*-302*e*, it may be understood that a set of images may include any number of images, e.g., five images, ten images, one hundred images, one thousand images, ten thousand images, etc.

FIG. 3A illustrates a first feature vector 310 that is determined based on entities detected in image 302*a* and a second feature vector based on entities detected in image 302*e*. As shown in FIG. 3A, the entities detected in image 302a include "basketball" with a probability value 0.4, "sports" with a probability value 0.6, "crowd" with a probability value 0.7, "arena" with a probability value 0.1, and "food" with a probability value of 1. Entities "clock" and "shoes" are not detected in image 302a and are therefore associated with probability value of 0. Similarly, FIG. 3A illustrates a second feature vector 320 that is determined based on entities detected in image 302e. The entities detected in image 302e include "basketball" with a probability value 0.9, "sports" with a probability value 0.9, "crowd" with a probability value 0.7, "arena" with a probability value 0.6, "clock" with a probability value of 0.8, and "shoes" with a probability value of 0.7. The entity "food" is not detected in image 302e and is therefore associated with a probability value of 0. While FIG. 3A shows image feature vectors with respective probability values associated with each entity, in different implementations, the respective values associated with each entity may be logical values, e.g., "Yes" (indicating that the entity was detected in the image) and "No" (indicating that the entity was not detected in the image), integer values, etc.

FIG. 3B illustrates the set of images of FIG. 3A with an aggregate feature vector, according to some implementations. For ease of illustration, certain reference numerals are omitted from FIG. 3B. As shown in FIG. 3B, the aggregate feature vector 330 for the plurality of images 302a-302e is constructed based on image feature vectors of individual images 302a-302e. In the example shown in FIG. 3B, the value for each feature of the aggregate feature vector is determined based on a count of images from a plurality of images (e.g., images 302a-302e) in which the entity corresponding to the feature is detected. For example, in the aggregate feature vector 330, the entity "basketball" is associated with a value "5" that indicates that the entity was detected in each of the images 302a-302e; the entity "sports" is associated with a value "4" that indicates that the entity was detected in four images out of the images 302a-302e; and so on. In some implementations, the value for each feature of the aggregate feature vector may be determined based on a binomial distribution. In some implementations, parameters for the binomial distribution may be a total number (N) of images (e.g., 5 for images 302a-302e) and a estimate ($p_d$) that may be generated per cluster and may approximate a number of the plurality of images in which the entity associated with each feature is detected divided by the total number (N) of images.

Figure 4:
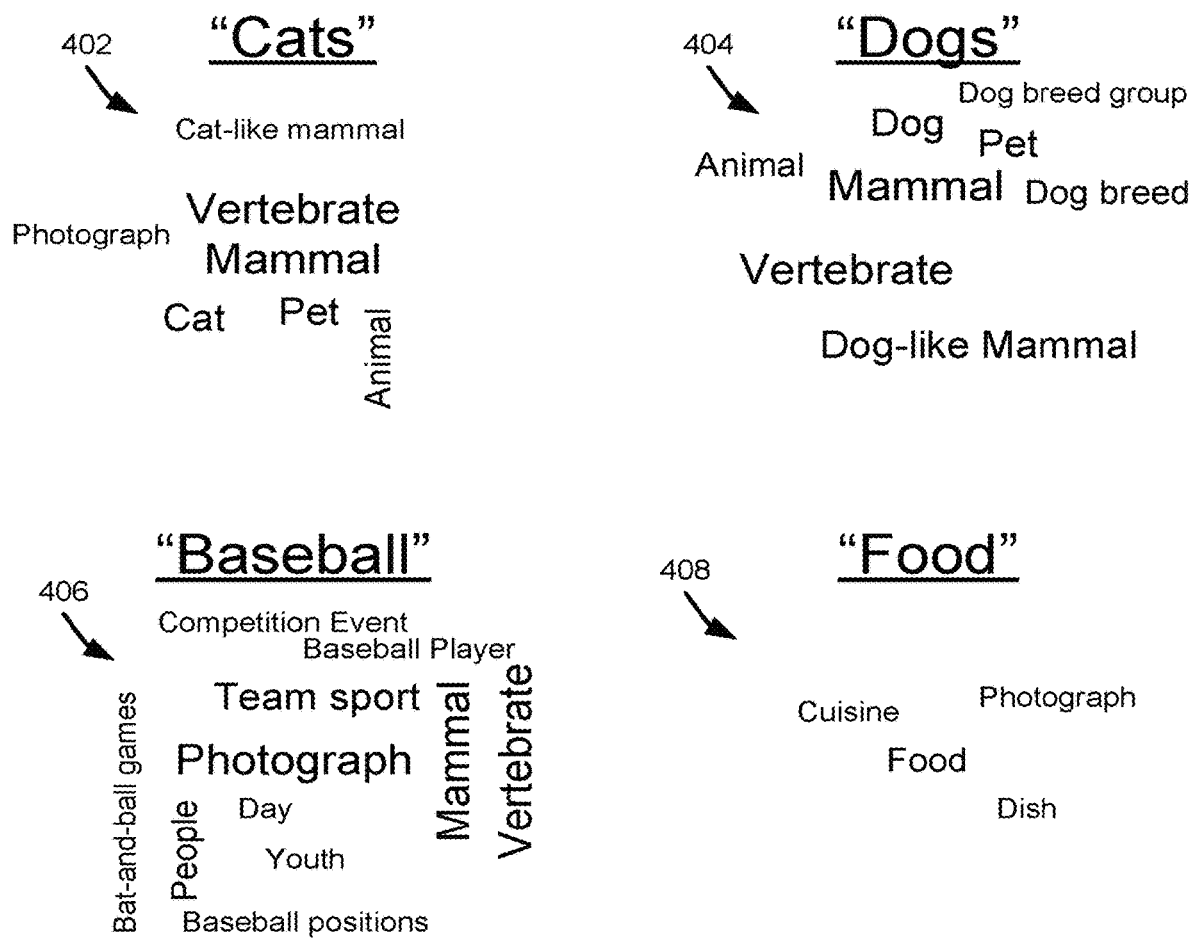
FIG. 4 illustrates a visual depiction of clusters, according to some implementations.

FIG. 4 illustrates a visual depiction of clusters, according to some implementations. In FIG. 4, four clusters 402-408 are shown. For ease of illustration, each cluster is illustrated with associated human-readable text, e.g. cluster 402 is labeled "cats," cluster 404 is labeled "dogs," cluster 406 is labeled "baseball,", and cluster 408 is labeled "food." However, it will be understood that the foregoing labels are for illustrative purposes only, and that clusters that are automatically determined using the techniques described herein may be based on aggregate feature vectors of sets of images and may not be associated with human-readable text.

In some implementations, human-readable text associated with a cluster may be determined based on a semantic analysis of the cluster feature vector associated with the cluster. For example, if a cluster feature vector includes entities such as "basketball", "arena", "basketball hoop", "audience", etc., text such as "basketball" may be associated with the cluster. In some examples, where users permit use of metadata associated with the plurality of images, text may be associated with the cluster based on such metadata, e.g., location, timestamps, etc. For example, text "dinner" may be associated with a cluster based on determination that location metadata corresponding to a restaurant and timestamps corresponding to evening. In different implementations, a combination of cluster feature vector and image metadata may be used to determine text associated with a cluster. In implementations where users do not provide consent for use of such data, determination of text associated with the cluster is not performed.

In the clusters shown in FIG. 4, various entities are listed, in different font sizes. For example, in cluster 402, the entities "Vertebrate" and "Mammal" are shown in a larger font size, the entities "Pet," "Animal," and "Cat-like Mammal" are shown in a smaller font size, and the entities "Snapshot" and "Tail" are shown in still smaller font size. In the examples shown in FIG. 4, the font sizes correspond to a number or proportion of images associated with the cluster in which that entity is detected. For example, in cluster 402, the entity "vertebrate" is detected in a greater percentage of images in the cluster than the entity "tail".

Each of the clusters 402-408 is shown prior to normalization. For example, in cluster 408, the entity "food" is shown in a larger font size than other entities such as "Dish," "Cuisine," and "Photograph". However, the size of "food" in cluster 408 is smaller than "Vertebrate," "Mammal," etc. in clusters 402 and 404, and "Photograph," "Mammal," "Black," etc. in cluster 406. The relative size indicates that a greater proportion of images associated with clusters 402 and 404 are detected as including "vertebrate" than the proportion of images associated with cluster 408 that are detected as including "Food." As described with reference to FIG. 2, clusters may be normalized prior to matching with an aggregate feature vector for a set of images, in order to ensure that the matching is performed independent of the distribution of different entities within each cluster.

Figure 5:
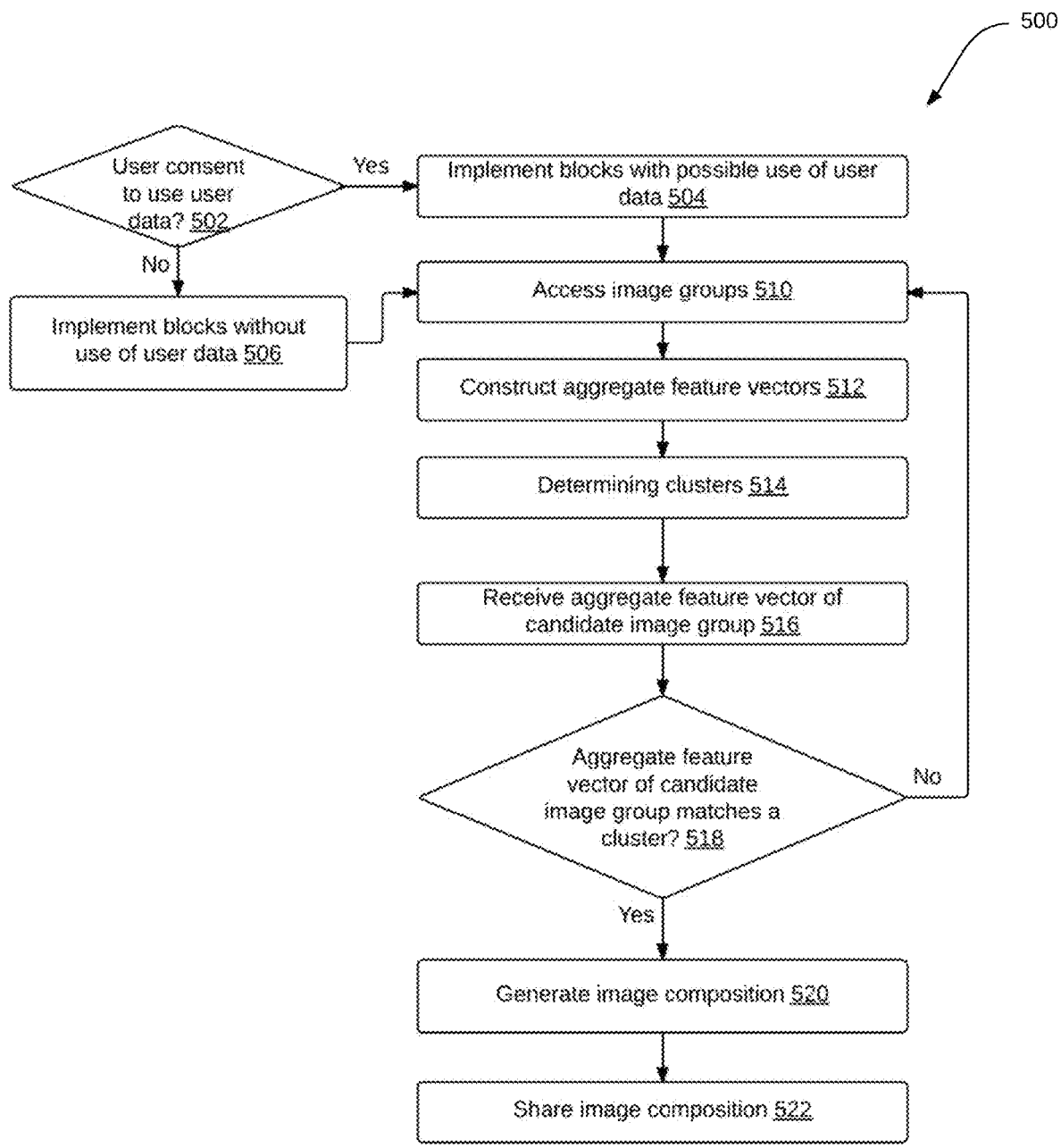
FIG. 5 is a flow diagram illustrating another example method to provide image composition suggestions, according to some implementations.

FIG. 5 is a flow diagram illustrating another example method to provide image composition suggestions, according to some implementations.

In some implementations, method 500 can be implemented, for example, on a server system 102 as shown in FIG. 1. In other implementations, some or all of the method 500 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 500.

Some implementations can initiate method 500 based on user input. A user may, for example, have selected the initiation of the method 200 from a displayed user interface. In some implementations, method 500 or portions thereof can be performed with guidance by the user via user input.

In some implementations, the method 500, or portions of the method, can be initiated automatically by a device. For example, the method (or portions thereof) can be periodically performed or performed based on the occurrence of one or more particular events or conditions. For example, such events or conditions can include a particular application being opened by a user, obtaining one or more images that have been newly captured by, uploaded to, or otherwise accessible by a device (e.g. a user device), a predetermined time period having expired since the last performance of method 500, and/or one or more other events or conditions occurring which can be specified in settings of a device implementing method 500. In some implementations, such conditions can be previously specified by a user in stored custom preferences of the user (accessible by a device or method with user consent). In some examples, a device (server or client) can perform the method 500 with access to a large collection of accessible images, e.g., a user's collection of images (if user consent is received). In another example, a camera, cell phone, tablet computer, wearable device, or other client device can capture one or more images and can perform the method 500. In addition, or alternatively, a client device can send one or more captured images to a server over a network, and the server can process the images using method 500.

In block 502, it is checked whether user consent (e.g., user permission) has been obtained to use user data in the implementation of method 500 (and method 200, described above). For example, user data can include user preferences, user images in an image collection (e.g., one or more albums of the user), information about a user's social network and contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations. If user consent has been obtained from the relevant users for which user data may be used in the method 500, then in block 504, it is determined that the blocks of the methods herein can be implemented with possible use of user data as described for those blocks, and the method continues to block 510. If user consent has not been obtained, it is determined in block 506 that blocks are to be implemented without use of user data, and the method continues to block 510. In some implementations, if user consent has not been obtained, the remainder of method 500 is not performed, and/or particular blocks needing the user data are not performed.

In block 510, image groups are accessed. An image group includes a plurality of images. In various implementations, an image group may be any collection of images, e.g., an image album, a single webpage that includes the images, an image collage or mosaic that includes multiple images, an online slideshow or animation that includes the images, etc. In implementations where the user associated with an image group provides consent for use of sharing data, the image group may be accessed based on determination of whether the image group was shared. For example, determination that the image group was shared may be based on sharing information for the image group, e.g., based upon existence of a "shared" parameter in the social network in which the image group was shared, e.g., as an album, determining that a link to the image group was shared in an email or chat message sent by the user, receiving an indication from the user that the image group was shared, etc. For example, a server system 102 or any of client devices 120-126 may access the image groups over network 130.

In some implementations, the image groups may each be associated with one or more users. In the implementations where the image groups are associated with one or more users, user consent is obtained prior to accessing the image groups, and if one or more users do not provide consent, image groups associated with those users are not accessed. In some implementations, a user may provide consent to particular image groups, and decline or not provide consent for other image groups. In these implementations, the particular image groups for which the user has provided consent may be accessed and the other image groups for which consent has been declined or not provided are not accessed.

In some implementations, the image groups may be shared by the associated user publicly, e.g., on a public website, with associated permission for access of the image groups by any user or device that accesses the website. In some implementations, the image groups may be shared to a limited audience, e.g., on a restricted website (e.g., a social network website, a private website that requires user authentication for access, in an email message, in a messaging conversation such as chat, etc.) In the implementations where the image groups are shared to a limited audience, user consent to access such image groups is obtained prior to performing to block 510.

Upon accessing image groups, individual images in the image group may be identified. In some implementations, individual images may be accessed without accessing associated metadata. In some implementations, metadata associated with the individual images may also be accessed. For example, metadata may include locations, timestamps, image labels, tags, etc. associated with one or more of the individual images. The method continues to block 512.

In block 512, aggregate feature vectors for image groups accessed in block 510 are determined. In some implementations, a count of images in the image groups may be determined (e.g., a first image group includes 2 images, a second group includes 10 images, etc.). In some implementations, aggregate feature vectors are constructed specifically for those image groups that include at least a minimum number (e.g., 5, 20, etc.) of images and aggregate feature vectors are not constructed for image groups that do not include at least the minimum number of images.

For example, constructing the aggregate feature vectors for image groups of at least certain numbers of images permits analysis of image groups that are associated with specific characteristics, e.g., which may be necessary to reliably determine clusters in block 514. For example, image characteristics can include one or more of color, brightness, sharpness, image content such as faces, objects, etc. In some implementations, image groups that include greater than a maximum number of images may be excluded when constructing aggregate feature vectors. For example, exclusion of image groups with greater than the maximum number of images may be advantageous to ensure that clustering of the image group can be performed. Image groups with a very large number of images (e.g., 10,000 images) may have a very large number of entities, and may have sparse aggregate feature vectors which do not match a cluster. Determination of aggregate feature vector for an image group may be performed similar to that of constructing an aggregate feature vector as described with reference to block 214 of FIG. 2. The method continues to block 514.

In block 514, one or more clusters are programmatically determined based on respective aggregate feature vectors associated with the image groups accessed in block 510 and included in constructing the aggregate feature vectors in block 512. Determination of the clusters may be performed by one or more of: applying a Dirichlet process mixture model, applying a hierarchical Dirichlet process mixture model, using latent Dirichlet allocation (LDA), or other clustering techniques. In some implementations, the clustering may be performed iteratively, e.g., by performing splitting and merging operations multiple times over the groups of images. In some implementations, the determining of clusters may be performed in parallel, e.g., on multiple devices that perform the clustering.

In determining the one or more clusters, image groups are associated with a respective cluster. For example, image groups that have associated aggregate feature vectors that include entities related to "basketball" may be included in a same cluster, e.g., based on a similarity in the aggregate feature vectors. In some implementations, each cluster may include image groups that are associated with similar aggregate feature vectors. Individual aggregate feature vectors corresponding to each image group in a cluster may differ from those of other image groups in the cluster, e.g., some image groups in the basketball cluster may be associated with respective feature vectors that includes the entity "food" while other groups in the basketball cluster may be associated with respective feature vectors that do not include the entity "food." For example, such differences may be due to each of the image groups being overall associated with basketball (e.g., includes entities such as basketball, hoop, arena) but including images that are also associated with other entities (e.g., food, e.g., if the user associated with the image group included images of food in the album).

In various implementations, determination of clusters includes determining a cluster feature vector. The cluster feature vector for a cluster is determined independent of determination of cluster feature vector for other clusters. Cluster feature vectors may be determined based on statistically aggregating the individual aggregate feature vectors of the image groups in the cluster. In some implementations, e.g., when machine learning techniques are used to cluster the image groups, cluster feature vectors may be learned during the clustering.

In some implementations, the cluster feature vectors may be normalized. For example, it may be determined that image groups in certain clusters have, on average, a larger number of images that image groups in other clusters. A cluster-scaling factor may be determined, based on a proportion of an average (e.g., mean, median, or mode, determined over the respective counts of images in each image group of a cluster) number of images in each cluster, compared to an overall average across the one or more clusters. The cluster-scaling factor can ensure that clusters that include image groups that have fewer images on average and clusters that include image groups that have a higher count of images on average are treated similarly, e.g., when comparing with aggregate feature vectors for a candidate image group, as described below. The method proceeds to block 516.

In block 516, an aggregate feature vector of a candidate image group is received. For example, the aggregate feature vector may be determined based on a plurality of images associated with a user. In some implementations, the aggregate feature vector may be a normalized feature vector. In some implementations, the aggregate feature vector may be normalized after it is received, e.g., based on a count of images from which the aggregate feature vector was constructed. The method proceeds to block 518.

In block 518, it is determined whether the aggregate feature vector of the candidate image group matches a cluster of the clusters determined in block 514. Determination that the aggregate feature vector matches a cluster may be performed in a manner similar to that described above with reference to FIG. 2. If a match is determined, the method proceeds to block 520, otherwise the method proceeds to 510.

In block 520, it is determined whether the user has provided input to generate an image composition, e.g., based on images in the candidate image group. For example, a suggestion for an image composition may be provided to the user, and user input requesting generation of the image composition may be received in response to the suggestion. In another example, the user may opt for automatic generation of image compositions, and the image composition is generated based on this selection by the user. The image composition may be generated in a manner similar to that described above with reference to FIG. 2. The method proceeds to block 522.

In block 522, the generated image composition is shared, e.g., similar to block 224 of FIG. 2 described above.

In FIG. 5, various blocks (e.g., blocks 510-522) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

In some implementations, method 500 (and method 200) may be performed by a server (e.g., server device 104), one or more client devices (e.g., client devices 120-126), or a combination of a server and one or more client devices.

For example, in some implementations, blocks 510-514 are performed by a server, and blocks 516-522 are performed by a client device. These implementations may be advantageous, e.g., when the number of image groups is large. For example, by implementing block 510 on a server, accessing image groups may be performed more efficiently than a client device, e.g., if the server has a high bandwidth connection to network 130, if the server stores the image groups (e.g., in database 106), etc. In these implementations, the server may provide (e.g., transmit over network 130) the cluster feature vectors (e.g., as a data file) to a client device, e.g., for the client device to utilize to provide suggestions for image compositions. This may be advantageous, e.g., since the data file may be small in file size and can eliminate the need for a client device to access the image groups, require substantial network usage (e.g., to download images of the image groups, which may be large in file size) or may be costly (e.g., if the network is metered). Further, by implementing blocks 512 and 514 on a server, a relatively higher computational power of a server may permit faster determination of clusters, e.g., than determining clusters with a relatively low computational power client device. Further, in these implementations, the aggregate feature vector of candidate image groups may be determined by a client device (block 516), which may be advantageous, e.g., by eliminating the need to upload the images from the image group to the server. Further, performing block 518 on a client device can permit providing suggestions to generate image compositions, e.g., before images are uploaded to the server, when a client device is disconnected from network 130, etc.

In some implementations, e.g., when the user does not prefer to upload images to a server, performing all or part of method 500 on a client device may be advantageous, e.g., to enable image compositions to be generated locally. In some implementations, performing all or part of method 500 on a server may be advantageous, e.g., when the number of image groups accessed is large, when the number of detected entities is large, etc.

FIG. 6 is a diagrammatic illustration of an example of user interface 600 to provide suggestion for an image composition, according to some implementations. User interface 600 includes thumbnails (602, 604, 606, 608, 610). For example, images 602-610 may be thumbnails corresponding to a plurality of images that are identified for a composition. While FIG. 6 shows five images 602-610, in various implementations, any number of images may be included in user interface 600. For example, if the plurality of images includes a large number of images (e.g., 50 images), a subset of the plurality of images may be included in user interface 600. In some implementations, e.g., implementations that do not include an image preview, images 602-610 may not be included in user interface 600. In some implementations, information about the images, e.g., timestamp, location, labels, etc. may be displayed in addition to or alternative to thumbnails 602-610.

User interface 600 further includes text 620 "Would you like to share an album with these images from yesterday's basketball game?". In some implementations, an aggregate feature vector based on images (e.g., including images 602-610) may match a first cluster (e.g., as described above with reference to FIGS. 2 and 5) and one or more portions of text 620 may be based on the first cluster. For example, as shown in FIG. 6, the portion may be "basketball game," e.g., if the text "basketball game" is associated with the first cluster. In some implementations, text 620 may be omitted. In some implementations, text 620 may include one or more additional portions, e.g., "yesterday's" that is based on data associated with one or more of the plurality of images (e.g., images 602-610) e.g., image metadata, e.g., location, timestamp, etc. In some implementations, text 620 may indicate a type of composition that will be shared, e.g., "an album". In some implementations, text 620 may include default text, e.g., "Do you want to share these images?", and not include portions based on the first cluster and/or data associated with the plurality of images.

User interface 600 further includes one or more elements 622 ("Jason", "Teresa", "Catherine", "Others"). In some implementations, elements 622 may be user-selectable, e.g., the users may select an element to indicate whether the image composition is to be shared with a user corresponding to the element 622 (e.g., "Jason"). In some implementations, a user element 622 (e.g. "Others") when selected may present additional options, e.g., to select additional users with whom the image composition is shared.

User interface 600 also includes user-selectable elements 624 ("Yes") and 626 ("No"). In some implementations, an image composition, e.g., based on a plurality of images including images corresponding to thumbnails 602-610, is generated in response to receiving user input (e.g., selection of user-selectable element 624) to generate the image composition and the image composition is not generated in response to receiving user input (e.g., selection of user-selectable element 626) to not generate the image composition. In some implementations, e.g., if the user indicates a preference for automatic generation of image compositions, the image composition may be generated automatically, and user-selectable elements 624 and 626 may be omitted.

In different implementations, user interface 600 may include a variety of different user interface components (e.g., as illustrated in FIG. 6). In some implementations, one or more user interface components may be omitted or additional components not shown in FIG. 6 may be included. For example, in some implementations, additional components may be included in user interface 600, e.g., to enable the user to select a type of the image composition to be generated, to enable the user to specify one or more parameters for the image composition, e.g., if the image composition is a video, a user may specify a duration for the composition, select audio for the composition; if the image composition is an image collage, a user may specify an orientation (e.g., portrait, landscape); if the image composition is an album, a user may specify an album title, an album background; etc.

Figure 7:
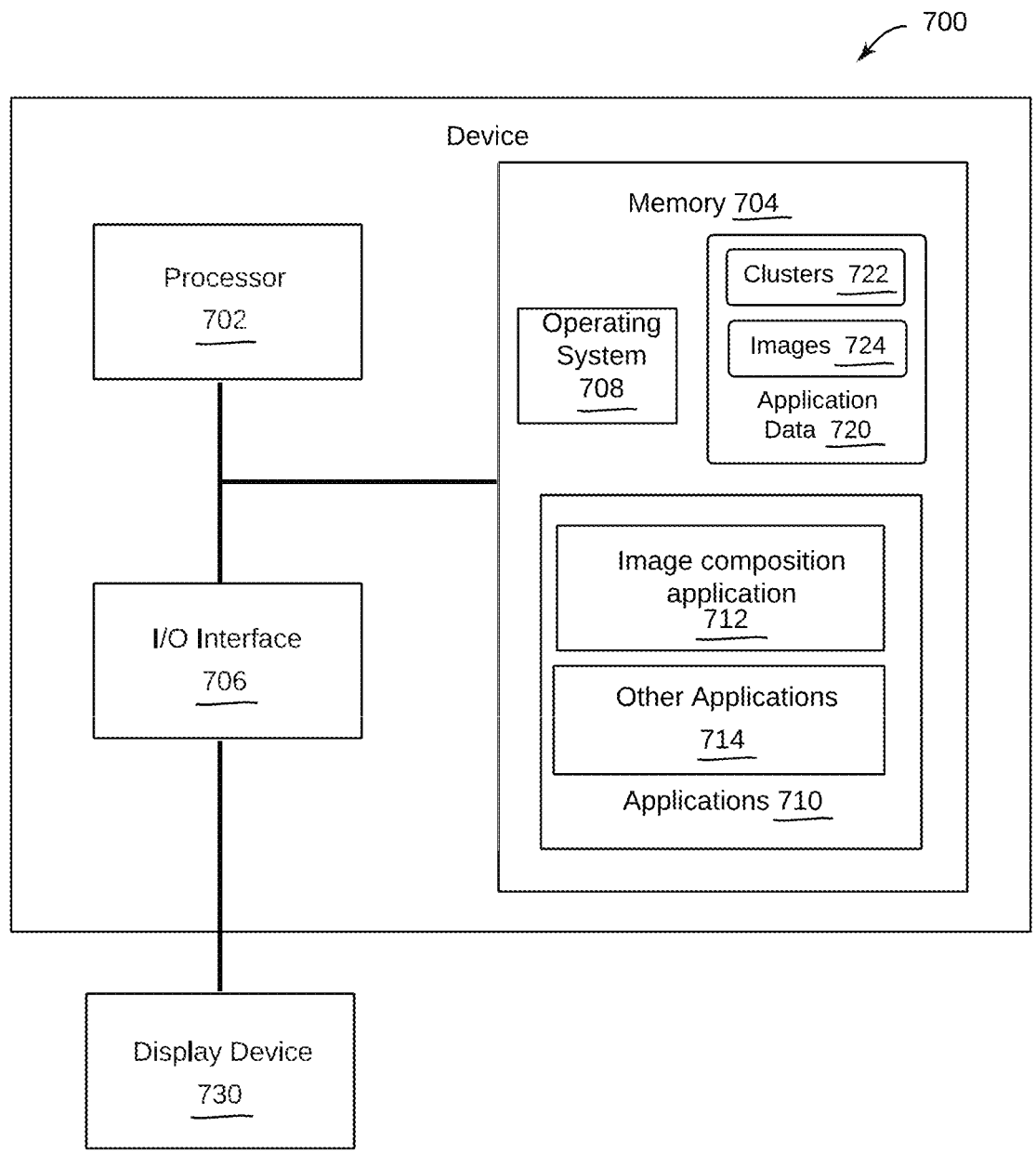
FIG. 7 is a block diagram of an example device which may be used for one or more implementations described herein.

FIG. 7 is a block diagram of an example device 700 which may be used to implement one or more features described herein. In one example, device 700 may be used to implement a computer device, e.g., a server device (e.g., server device 104 of FIG. 1), and perform appropriate method implementations described herein. Device 700 can be any suitable computer system, server, or other electronic or hardware device. For example, the device 700 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 700 includes a processor 702, a memory 704, and input/output (I/O) interface 706.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., a graphics editing engine, web hosting engine, social networking engine, etc. and application data 720. In some implementations, applications 710 can include instructions that enable processor 702 to perform the functions described herein, e.g., some or all of the methods of FIGS. 2 and 5.

For example, applications 710 can include an image management application 712, which as described herein can provide image viewing, manipulation, sharing, and other functions, e.g., providing displayed user interfaces responsive to user input to display user-selectable elements. In some implementations, the image management application (s) can include image editing to receive user input, select input images, modify pixels of images (e.g., by applying edit operations to an input image), provide output causing display of images and/or suggestions on a display device of the device 700. Other applications or engines 714 can also or alternatively be included in applications 710, e.g., email applications, SMS and other phone communication applications, web browser applications, media display applications, communication applications, web hosting engine or application, social networking engine or application, etc. Any of software in memory 704 can alternatively be stored on any other suitable storage location or computer-readable medium. In addition, memory 704 (and/or other connected storage device(s)) can store images, shared album data, sharing models, user data and preferences, and other instructions and data used in the features described herein. Memory 704 and any other type of storage (magnetic disk, optical disk, magnetic tape, or other tangible media) can be considered "storage" or "storage devices."

For example, application data 720 can include clusters 722 and one or more images 724. For example, clusters 722 may include cluster feature vectors for one or more image clusters, as determined using the method 500. Further, clusters 722 may include semantic concepts and/or text associated with one or more clusters, in addition to the cluster feature vectors. Images 724 can include a plurality of images and associated metadata. For example, when device 700 is a client device, images 724 can be images captured by a camera of the client device (not shown). In another example, when device 700 is a server device, images 724 can be images stored at the server (e.g., uploaded to the server from client device). In some implementations, image metadata may be stored along with, or separately from images 724.

I/O interface 706 can provide functions to enable interfacing the server device 700 with other systems and devices. For example, network communication devices, storage devices (e.g., memory and/or database 106), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.). Display device 730 is one example of an output device that can be used to display content, e.g., one or more images provided in an image sharing interface or other application as described herein. Display device 730 can be connected to device 700 via local connections (e.g., display bus) and/or via networked connections and can be any suitable display device, some examples of which are described below.

For ease of illustration, FIG. 7 shows one block for each of processor 702, memory 704, I/O interface 706, and software blocks 708 and 710. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 700, e.g., processor(s) 702, memory 704, and I/O interface 706. An operating system, software and applications suitable for the client device can be provided in memory and used by the processor, e.g., image management software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 730, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 200 and/or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Implementations discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method comprising:
identifying images associated with a user;
detecting one or more entities in the images;
constructing an aggregate feature vector for the images that describes a number of each type of entity in the images;
performing a vector comparison of the aggregate feature vector to cluster features to identify similarities; and
generating an image composition from the images wherein the image composition includes one or more images with features associated with a likelihood of sharing that meets a threshold, wherein the likelihood of sharing is determined based on the vector comparison.

2. The method of claim 1, further comprising:
generating groups of images based on the clustered features, wherein at least one of the groups of images includes a type of activity not associated with prior groups of images; and
providing a suggestion to the user for a new group based on the type of activity not associated with prior groups of images.

3. The method of claim 2, further comprising determining a match between the aggregate feature vector and a first cluster with a first cluster feature based on the aggregate feature vector meeting a first cluster-specific threshold for the first cluster.

4. The method of claim 3, wherein the first cluster-specific threshold indicates that an entity is present in at least a percentage of respective images from the first cluster.

5. The method of claim 3, further comprising providing a suggestion in a user interface to share an image from the first cluster responsive to a determination that the image meets one or more quality criteria.

6. The method of claim 1, wherein performing the vector comparison includes determining a vector distance between the aggregate feature vector and different cluster vectors that includes respective cluster features.

7. The method of claim 1, further comprising normalizing the aggregate feature vector by multiplying the aggregate feature vector by a scaling factor that represents a total number of the images associated with the user.

8. The method of claim 1, wherein the type of entity includes at least one of an animal type, a food type, or a person type in the images.

9. A non-transitory computer-readable medium with instructions stored thereon that, when executed by one or more computers, cause the one or more computers to perform operations, the operations comprising:
identifying images associated with a user;
detecting one or more entities in the images;
constructing an aggregate feature vector for the images that describes a number of each type of entity in the images;
performing a vector comparison of the aggregate feature vector to cluster features to identify similarities; and
generating an image composition from the images wherein the image composition includes one or more images with features associated with a likelihood of sharing that meets a threshold, wherein the likelihood of sharing is determined based on the vector comparison.

10. The computer-readable medium of claim 9, wherein the operations further comprise:
generating groups of images based on the clustered features, wherein at least one of the groups of images includes a type of activity not associated with prior groups of images; and
providing a suggestion to the user for a new group based on the type of activity not associated with prior groups of images.

11. The computer-readable medium of claim 10, wherein the operations further comprise determining a match between the aggregate feature vector and a first cluster with a first cluster feature based on the aggregate feature vector meeting a first cluster-specific threshold for the first cluster.

12. The computer-readable medium of claim 11, wherein the first cluster-specific threshold indicates that an entity is present in at least a percentage of respective images from the first cluster.

13. The computer-readable medium of claim 11, wherein the operations further comprise providing a suggestion in a user interface to share an image from the first cluster responsive to a determination that the image meets one or more quality criteria.

14. The computer-readable medium of claim 9, wherein performing the vector comparison includes determining a vector distance between the aggregate feature vector and different cluster vectors that includes respective cluster features.

15. A system comprising:
one or more processors; and
a memory that stores instructions that, when executed by the one or more processors cause the one or more processors to perform operations comprising:
identifying images associated with a user;
detecting one or more entities in the images;
constructing an aggregate feature vector for the images that describes a number of each type of entity in the images;
performing a vector comparison of the aggregate feature vector to cluster features to identify similarities; and
generating an image composition from the images wherein the image composition includes one or more images with features associated with a likelihood of sharing that meets a threshold, wherein the likelihood of sharing is determined based on the vector comparison.

16. The system of claim 15, wherein the operations further comprise:

generating groups of images based on the clustered features, wherein at least one of the groups of images includes a type of activity not associated with prior groups of images; and providing a suggestion to the user for a new group based on the type of activity not associated with prior groups of images.

17. The system of claim 16, wherein the operations further comprise determining a match between the aggregate feature vector and a first cluster with a first cluster feature based on the aggregate feature vector meeting a first cluster-specific threshold for the first cluster.

18. The system of claim 17, wherein the first cluster-specific threshold indicates that an entity is present in at least a percentage of respective images from the first cluster.

19. The system of claim 17, wherein the operations further comprise providing a suggestion in a user interface to share an image from the first cluster responsive to a determination that the image meets one or more quality criteria.

20. The system of claim 15, wherein performing the vector comparison includes determining a vector distance between the aggregate feature vector and different cluster vectors that includes respective cluster features.

* * * * *